Jan. 24, 1956   E. L. SCHUMACHER ET AL   2,731,882
OPHTHALMIC MOUNTINGS
Filed Nov. 8, 1951
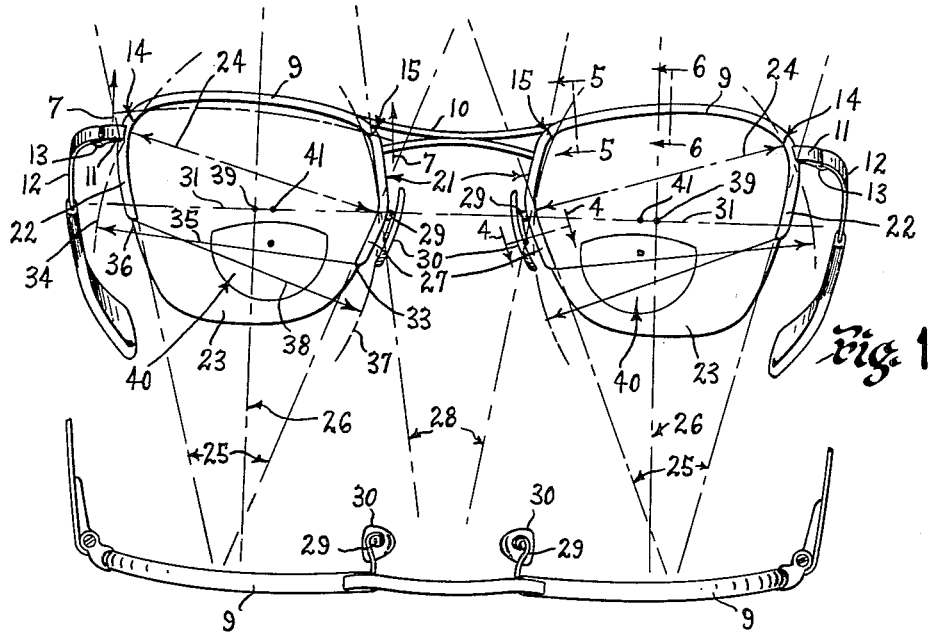
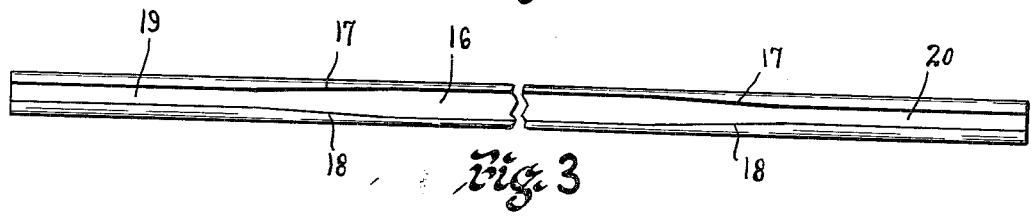
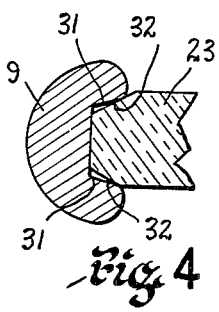
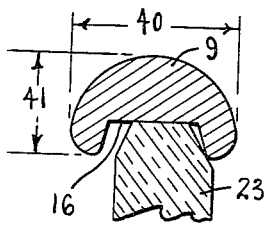
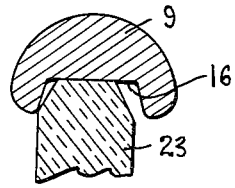
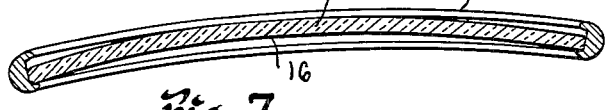
INVENTOR
ELMER L. SCHUMACHER
ARMAND DE ANGELIS
BY
Louis L. Gagnon
ATTORNEY United States Patent Office 2,731,882
Patented Jan. 24, 1956

2,731,882

OPHTHALMIC MOUNTINGS

Elmer L. Schumacher and Armand De Angelis, Southbridge, Mass., assignors to American Optical Company, Southbridge, Mass., a voluntary association of Massachusetts Application November 8, 1951, Serial No. 255,421

3 Claims. (Cl. 88—41)

This invention relates to improvements in ophthalmic mountings and has particular reference to a novel half-frame type mounting whereby the major portion of the lens supporting structure is positioned above the geometrical centers of the lenses and has a resilient tong-like gripping action with the lenses to permit said lenses to be readily sprung into and firmly but replaceably or interchangeably held in said structure.

In the dispensing of ophthalmic mountings, lens blanks having finished optical surfaces of different optical curvatures on the opposed sides thereof and of an established standard size and contour shape are provided in stock form. From these standard blanks, the various prescriptive characteristics are laid out and the blanks are cut and edged to different sizes and shapes in accordance with the requirements of different individuals. These sizes range from 38 to 48 millimeters and the prescriptive requirements often embody decentrations of optical centers or reading segments in the magnitude of from 3 to 5 millimeters. The standard blank, therefore, is so initially controlled as to permit any one of the full range of such various sizes and shapes as well as decentrations to be obtained from said blank.

The optical surfaces formed on such blanks are generally in accordance with different given base curves which cause the lenses to be of different meniscus shapes and when cut to shapes other than a non-circular contour, the upper edges thereof will cup forwardly varying amounts according to said different base curves or meniscus shapes.

When designing ophthalmic mountings or lens supporting structures for lenses of the above character, one of the requisites is that the designer must keep in mind these various requirements and must control the lens shape of his design so that it may be formed from a standard lens blank.

It is a principal object, therefore, of this invention to provide a lens supporting structure which will meet with all of the above requirements and which, in addition thereto, will be such as to have its various component parts in proper positional relation with each other for ease in fitting the mounting to the requirements of different individuals and which further embodies portions having a tong-like gripping action with the lenses to firmly and interchangeably hold them in the supporting structure.

Another object is to provide a lens supporting structure of the above character with half-frame portions each having an inner groove extending throughout the length thereof shaped adjacent the nasal and temporal sides of the respective lenses to have a relatively intimate resilient gripping action with said edges and which, throughout the upper portion thereof, intermediate said nasal and temporal sides, is of an increased width which is such as to receive a number of different lenses of different base curvatures or of different meniscus shapes without requiring said intermediate portion to be altered as to the shape to which it is initially formed.

Another object is to provide an ophthalmic mounting of the above character which, while having a desirable cosmetic appearance, has dimensional characteristics and positional relation of parts such as to provide a maximum field of corrected vision for the eyes, desirable fitting qualities and a firm and interchangeable retaining action with the lenses.

Another object is to provide an ophthalmic mounting of the above character with lenses which may be edged to desired size and shape in a conventional manner and which may be positioned directly in assembled relation with the lens supporting structure without requiring additional operations to be performed thereon.

Another object is to provide an ophthalmic mounting of the above character having half-frame portions of initially controlled size and shape simulating the size and shape of the edge portions of the lenses to be connected therewith, each embodying downwardly and inwardly converging sections initially spaced apart a distance less than the width of the lens at said location and adapted to be sprung apart to receive a lens therebetween and to function cooperatively with the upper sections of the half-frame portions to rigidly and interchangeably hold the lenses therein.

Another object is to provide a mounting of the above character with half-frame type lens holding means having portions on the upper nasal sides thereof which are angled to converge downwardly and inwardly to points lying substantially on the horizontal center line of the lenses to provide properly spaced portions to which the nose pad supporting arms of the mounting may be attached in accordance with standard requirements and continuing with portions extending downwardly and angled outwardly for nose clearance and adapted to function cooperatively with downwardly and inwardly angled portions on the temporal sides of the lenses to grip and hold the lenses in said half-frame portions, said lenses being preshaped whereby the edge portions thereof to be gripped will have a relatively intimate fit with said half-frame portions.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred form only is given by way of illustration.

Referring to the drawings:

Fig. 1 is a front elevational view of the mounting embodying the invention;

Fig. 2 is a top plan view of the mounting;

Fig. 3 is an inner face view of the semi-rim portions of the mounting prior to its being bent to the shape illustrated in Fig 1;

Figs. 4, 5, and 6 are enlarged sectional views taken as on line 4—4, 5—5, and 6—6 of Fig. 1 and looking in the direction indicated by the arrows;

Fig. 7 is a sectional view taken as on line 7—7 of Fig. 1 and looking in the direction indicated by the arrows; and Fig. 8 is a view generally similar to Fig. 7.

Referring more particularly to the drawings wherein like characters of reference designate like parts throughout the several views, the mounting embodying the invention comprises a pair of metallic rim portions 9 connected on the nasal sides thereof by a bridge member 10 and having connected to the temporal sides thereof the endpieces 11 to which the temples 12 are pivotally connected, as illustrated at 13.

The bridge 10 and endpieces 11 are secured to the rims as by soldering, welding or other suitable means.

The rim portions are preferably formed of a metal having resilient characteristics such as stainless steel, nickel, gold-filled, beryllium copper or other suitable metal.

The rim portions 9 intermediate the points 14 and 15, as shown in Fig. 1, or throughout the length of the upper portions thereof which are shaped to follow the contour shape of the upper contour edges of the lenses, as shown best in Figs. 3 through 8, are provided with a relatively wide channel portion 16 having its side walls 17 and 18 converging slightly toward each other and blending into relatively narrow channel sections 19 and 20 which are to be disposed throughout the respective nasal sections 21 and the temporal sections 22 of said rim portions, that is, throughout the length of said nasal and temporal portions which are shaped to engage the respective portions of the lenses. The narrow channel sections 19 and 20, therefore, throughout the length of the respective nasal and temporal portions 21 and 22 are adapted to have the adjacent contour edges of the lenses 23 relatively intimately fitted therewith, as illustrated best in Fig. 4, while the wider sections 16 of the channels which extend throughout the width of the upper contour of the lenses is adapted to permit lenses of different meniscus shapes, such as illustrated in Figs. 7 and 8, to be used therewith without changing the initial coquilling or curvature to which the said upper sections of the rim portions 9 are initially formed. It is particularly pointed out that in Fig. 7 the lens 23 is shown as having a greater cupping or curvature than the lens 23 of Fig. 8. These two Figs. 7 and 8, therefore, diagrammatically illustrate how the rim sections may be attached to lenses of different meniscus shapes without the necessity of having to alter the initial curvature to which the said rim sections are formed.

It is particularly pointed out that the contour shapes of the lenses are so controlled that their greatest widths are along a diagonally disposed line, as indicated by the arrows 24, and that the opposed side edges of the lenses from said points of greatest width converge in a downward direction, as indicated by the lines 25, to a point of intersection lying outwardly of the vertical center line 26 of the lenses. The lower portions 27 of the nasal sections and the temporal sections 22 of the rim portions 9 are shaped to follow and to relatively intimately fit with the downwardly converging nasal and temporal sides of the lenses so as to have a firm tong-like gripping action therewith. The lenses are shaped on the upper nasal slides to converge downwardly and inwardly, as indicated by the lines 28, whereby said nasal sections adjacent their points of intersection with the horizontal center lines of the lenses will provide points of attachment for the pad arms 29 which are at an established spaced relation with each other to meet the requirements of most individuals. The pad arms 29 have nose pads 30 pivotally connected therewith and afford means for adjusting said pads to different widths and angles of noses as is common practice in the art. Therefore, the converging upper portions of the nasal sections of the rims, as illustrated by the angular lines 28, form a clearance for the upper inwardly angled portion of the nose and extend downwardly and inwardly to initially space the pad arms a distance apart which is more or less established as standard in the art while the lower sections 27 are in converging relation with the temporal sections 22 as indicated by the angles 25 to introduce the proper resilient tong-like gripping action, the said resiliency being that of the inherent resiliency of the material of the rim portions. It is also pointed out that the points of attachment of the guard or pad arms 29 with the nasal rim sections is along the horizontal center line 31 of the lenses which has been established as a standard in the ophthalmic art to permit the proper truing of the mounting. The downwardly converging nasal and temporal edge portions of the lenses which are engaged by the similarly angled rim sections 27 and 22, while introducing a tong-like gripping action on the lenses, also tend to force the lenses in an upward direction and to cause the upper edges thereof to intimately engage the base of the wide channel section 16. It is further pointed out that while the channels of the rim sections 22 and 27, as shown by the sectional view in Fig. 4, have an intimate fit with the adjacent edge of the lens, the upper converging sections of said nasal portions also have a similarly fitted relation whereby there will be little, if any, tendency for the lenses to tip forwardly or rearwardly with respect to the planes of the half-frame portions when in position of use. To insure this intimate fit, the channel sections 19 and 20 have slightly inward bevelled side surfaces 31 which engage a slight bevel 32 formed on the opposed sides of the edge of the lens. This bevel extends throughout the nasal portions, upper contour edges and outer temporal portions of the lenses which are engaged by the respective adjacent portions of the rim members.

Although the half-frame portions are initially shaped to the respective contour edges of the lenses with which they fit, the said depending sections 22 and nasal portions 21 have an initial spaced relation with each other which is less than the horizontal dimension of the lens so that when the lens is placed therein, the said depending sections will spread under the inherent resiliency of the rim portions to permit the lenses to be placed therebetween and to be resiliently held with a tong-like action. It is apparent that the lenses may be quickly and easily interchanged by manually forcing them inwardly or outwardly of the half-frame portions. It is further pointed out that the lenses may be edged by common commercial standard rimless edging techniques and that the slight bevel 32 might be quickly formed by conventional machine or hand processes.

The cross-sectional dimensions of the rim portions 9 also play an important part in firmly retaining the lenses in assembled relation with the supporting structure. In the present instance, the rim portions are preferably formed, as shown in Fig. 5, to a width 40 of approximately .125 of an inch while the overall thickness 41 is approximately .075. This is to introduce the desirable tong-like gripping action of the rim sections with the lenses when assembled therewith and to insure against accidental displacement of the lenses during the use of the mounting. It is to be understood, however, that these dimensional characteristics may be departed from within reasonable limits.

By reference to Fig. 1, it will be noted that if a downward pull is exerted on the lower temporal side of the lens in an effort to remove the lens from the half-frame portion, the lens will tend to turn about a fulcrum point 33 adjacent the end of the nasal section of the rim about an arc indicated by the curved line 34 and arrow 35. This motion will be resiliently resisted by the entire length of the depending section 22 while, on the other hand, if a pull is exerted on the lower nasal side thereof, the lens will tend to turn about a fulcrum point 36 adjacent the lower end of the temporal section 22 of the rim about an arc illustrated by the curve line 37 and arrow 38. This movement will be resisted primarily by the lower section 27 of the nasal portion of the rim but the upper portion of said nasal section will also function in this respect.

It is further pointed out that the major portion of the section 27 lies below a horizontal line passing through the geometrical centers 39 of the lenses while the major part of the temporal sections 22 lie above said line.

In view of the fact that the upper transverse sections of the rim portions are provided with an inner relatively wide groove or channel section 16 and that the depending nasal and temporal portions are provided with relatively narrow grooves or channel sections 19 and 20 only said latter sections are adapted to intimately engage and fit with the respective adjacent side edges of the lenses. The initial forward curving of the upper section, during the fabrication of the mounting, is such as to be along the arc of a curve intermediate the flattest and the strongest meniscus curves of lenses normally used in ophthalmic corrections. Due to this fact and that the inner channel 16 thereof is formed relatively wide, the rim portions of the mounting will, in most instances, not require adjustment when different power lenses are assembled therewith, that is, for the average range of different meniscus shapes which are commonly used. However, if a more meniscus shaped lens is required, the upper sections can be adjusted but it is the intent of the present structure to avoid the necessity of such an adjustment while providing a firm gripping action on the sides of the lenses whereby the lenses may be readily interchanged or replaced and will require no special treatment for connection with the frame portions other than the conventional edging and slight bevelling of the lenses.

While it is the intent of the present invention to provide an ophthalmic mounting wherein the lenses may be quickly and easily interchanged and with which the supporting structure will retain a firm gripping action with the lenses during the use thereof, it is also the intent to provide a mounting which will meet with the present style trends from the cosmetic and aesthetical viewpoint and, particularly, one which will require a minimum of effort as to the shaping and preparing of the lens to be assembled with the supporting structure. It is further pointed out that the major part of the supporting structure is positioned above the useful field of vision of the lenses and that the said lenses may be formed from standard blanks.

The so-called decentration of the optical centers and reading segments of the lenses is diagrammatically illustrated by the inset reading segments 40 and the optical centers 41, as shown in Fig. 1.

From the foregoing description, it will be seen that simple, efficient and economical means have been provided for accomplishing all the objects and advantages of the invention.

Having described our invention, we claim:

1. An ophthalmic mounting comprising a pair of meniscus-shaped lenses and half-frame members shaped to follow the upper, nasal and temporal sides of said lenses, each having an inner groove extending longitudinally thereof, the groove in the portions of the half-frame members shaped to follow the nasal and temporal sides of the lenses having a width approximating that of the adjacent edge thickness of the lens assembled therewith, so as to have a relatively intimate resilient gripping fit with the nasal and temporal sides of the lens, and the inner groove throughout the upper portion of the half-frame members being of a width greater than the width of the groove in said side portions of the half-frame members to accommodate the meniscus shape of the respective lenses while permitting the side portions thereof to have said relatively intimate fit with the adjacent edges of the lenses, and said half-frame members being connected on their nasal sides by a bridge member and having temple connection means adjacent their temporal sides.

2. An ophthalmic mounting comprising a pair of meniscus-shaped lenses having their nasal, upper and temporal side edges beveled and a pair of half-frame members shaped to follow said upper, nasal and temporal sides of a respective lens and each having an inner groove extending longitudinally thereof to receive the adjacent edges thereof, the groove in said portions of the half-frame members shaped to follow the nasal and temporal sides of the respective lenses having a width approximating that of the adjacent edge thickness of the respective lenses and having their opposed sidewalls beveled so as to have a relatively intimate resilient gripping fit therewith, and the inner groove throughout the upper portion of the said half-frame members being increased to a width greater than the width of the groove in said side portions of the half-frame members to accommodate the meniscus shape of said lenses while permitting the said side portions thereof to have said relatively intimate fit with the adjacent edges of the lenses, and said half-frame members being connected on the nasal sides thereof by a bridge member and having temple connection means adjacent the temporal sides thereof.

3. An ophthalmic mounting comprising a pair of meniscus-shaped lenses, a pair of semi-frame members joined by an intermediate bridge and each having an inner groove extending longitudinally thereof, and comprising an upper portion shaped substantially to the upper contour shape of the respective lenses and having depending nasal and temporal portions shaped substantially to the shape of said respective portions of the lenses, said temporal portions extending downwardly and angled inwardly toward the vertical center line of the lenses and said nasal depending portion comprising an upper portion extending downwardly and outwardly to a point substantially adjacent the horizontal center line of the lenses and a lower portion extending downwardly and inwardly in converging relation with the temporal portion, the greatest width of said lenses being the distance from the point of joinder of the temporal depending portion with the upper portion thereof and the joinder of the upper and lower portions of the nasal sides of the lenses adjacent said horizontal center line, and the groove in the portions of said semi-frame members above said greatest width of the lenses having a width greater than the edge thickness of the lens to accommodate the meniscus shape thereof, and in the portions of said semi-frame members below said portion of the lenses of greatest width having the groove being reduced to intimately fit with the adjacent edge of the lenses, and temple supporting means connected to the temporal sides of said half-frame members.

References Cited in the file of this patent

UNITED STATES PATENTS

| 2,112,644 | Bausch | Mar. 29, 1938 |
| 2,585,352 | Silverman | Feb. 12, 1952 |

FOREIGN PATENTS

| 718,780 | France | Nov. 5, 1931 |
| 965,781 | France | Feb. 22, 1950 |
| 977,995 | France | Nov. 22, 1950 |